US012151479B2

(12) United States Patent
Higuchi

(10) Patent No.: US 12,151,479 B2
(45) Date of Patent: Nov. 26, 2024

(54) LIQUID EJECTION HEAD

(71) Applicant: CANON KABUSHIKI KAISHA, Tokyo (JP)

(72) Inventor: Hiroshi Higuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/364,234

(22) Filed: Aug. 2, 2023

(65) Prior Publication Data

US 2023/0373215 A1 Nov. 23, 2023

Related U.S. Application Data

(63) Continuation of application No. 17/673,115, filed on Feb. 16, 2022, now Pat. No. 11,752,770.

(30) Foreign Application Priority Data

Feb. 26, 2021 (JP) ................................ 2021-030364

(51) Int. Cl.
*B41J 2/16* (2006.01)
*B41J 2/14* (2006.01)

(52) U.S. Cl.
CPC ......... *B41J 2/1623* (2013.01); *B41J 2/14201* (2013.01); *B41J 2/1618* (2013.01)

(58) Field of Classification Search
CPC .... B41J 2/1623; B41J 2/14201; B41J 2/1618; B41J 2/161; B41J 2002/14241; B41J 2/14233
See application file for complete search history.

(56) References Cited

U.S. PATENT DOCUMENTS

2018/0354267 A1* 12/2018 Fukumoto .............. B41J 2/1629

FOREIGN PATENT DOCUMENTS

| | | | |
|---|---|---|---|
| JP | 2009143014 | A | 7/2009 |
| JP | 2009143027 | A | 7/2009 |
| JP | 2017144663 | A | 8/2017 |
| WO | 2015080265 | A1 | 6/2015 |

* cited by examiner

*Primary Examiner* — Lisa Solomon
(74) *Attorney, Agent, or Firm* — Canon U.S.A., Inc. IP Division

(57) ABSTRACT

A liquid ejection head includes a first substrate including a structure and a second substrate bonded to the first substrate with an adhesive, wherein the first substrate includes a bonding surface bonded to the second substrate with the adhesive and a non-bonding surface that is not bonded to the second substrate, and wherein a recessed portion is disposed in the non-bonding surface between the structure and a bonding end of the bonding surface adjacent to the structure.

20 Claims, 8 Drawing Sheets

LIQUID EJECTION HEAD

CROSS-REFERENCE TO RELATED APPLICATIONS

The present application is a Continuation of U.S. patent application Ser. No. 17/673,115, filed on Feb. 16, 2022, which claims priority from Japanese Patent Application No. 2021-030364 filed Feb. 26, 2021, which are hereby incorporated by reference herein in their entireties.

BACKGROUND OF THE DISCLOSURE

Field of the Disclosure

The present disclosure relates to liquid ejection heads.

Description of the Related Art

Printing apparatuses that eject liquid for printing include a liquid ejection head that ejects liquid through ejection ports. If the liquid ejection head is formed by bonding a plurality of substrates with an adhesive, an excess adhesive can squeeze out from the bonding surface to decrease the throughput and device characteristics.

Japanese Patent Laid-Open No. 2011-207072 presents a method of forming grooves (recessed portions) in the bonding surface to which an adhesive is applied and receiving an excess adhesive generated by pushing the substrates to each other at bonding with the recessed portions. Receiving the excess adhesive with the recessed portions prevents the adhesive from squeezing out of the bonding surface.

SUMMARY OF THE DISCLOSURE

A liquid ejection head according to an aspect of the present disclosure includes a first substrate including a structure and a second substrate bonded to the first substrate with an adhesive, wherein the first substrate includes a bonding surface bonded to the second substrate with the adhesive and a non-bonding surface that is not bonded to the second substrate, and wherein a recessed portion is disposed in the non-bonding surface between the structure and a bonding end of the bonding surface adjacent to the structure.

Further features of the present disclosure will become apparent from the following description of exemplary embodiments with reference to the attached drawings.

DESCRIPTION OF THE EMBODIMENTS

Figure 1A:
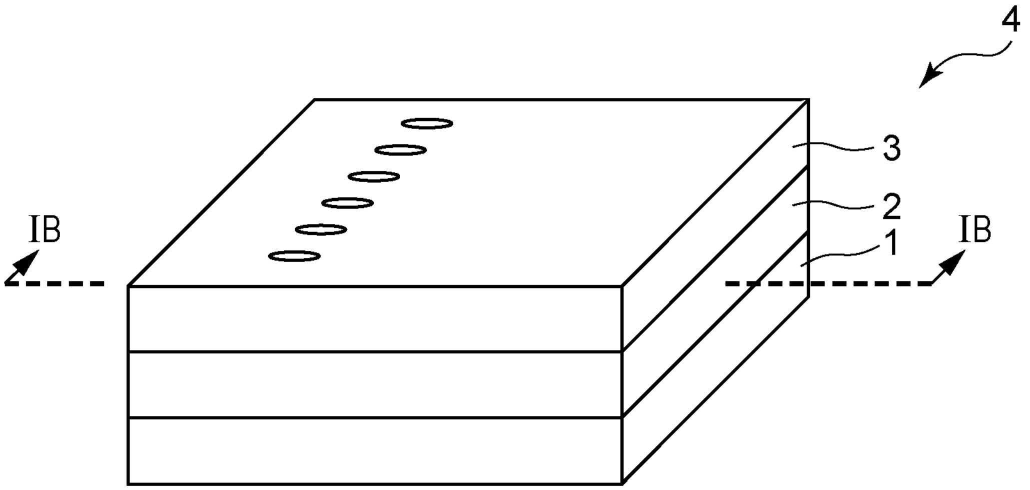
FIG. 1A is a schematic perspective view of a liquid ejection head according to an embodiment.

With the method disclosed in Japanese Patent Laid-Open No. 2011-207072, the recessed portions are formed only in the bonding surface. Therefore, if the adhesive cannot be completely received by the recessed portions and squeezes out of the bonding surface, the subsequent flow of the adhesive cannot be prevented. This can cause the adhesive that has squeezed out to adhere to a structure, such as a pressure generating element, exerting an influence on the printing quality.

Aspects of the present disclosure provide a liquid ejection head in which flow of an adhesive that has squeezed out of the bonding surface can be reduced or eliminated.

Embodiments of the present disclosure will be described in detail below. In the present application, the structures refer to a pressure generating element 21 (FIG. 1B), an ejection port 31 (FIG. 1B), and a communication port 5 (FIGS. 7A and 7B), to be described later. In the present application, a substrate in which the above structures are formed is referred to as a first substrate, and a substrate bonded to the first substrate with an adhesive is referred to as a second substrate. Specifically, a pressure generating substrate 2, described later, may be regarded as the first substrate, and a channel substrate 1 as the second substrate. Alternatively, an ejection port substrate 3 may be regarded as the first substrate, and the pressure generating substrate 2 as the second substrate.

First Embodiment

Liquid Ejection Head

Figure 1B:
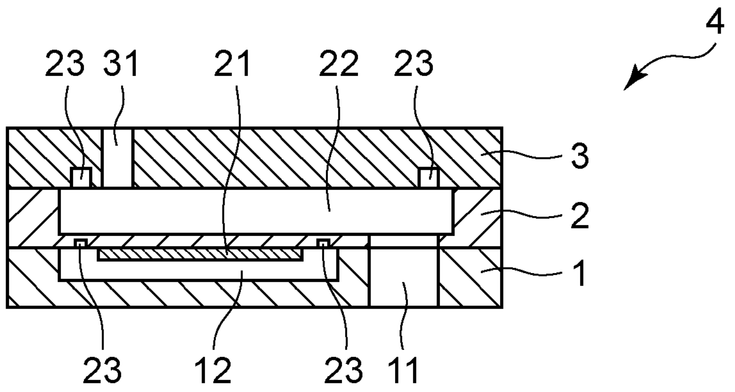
FIG. 1B is a cross-sectional view taken along line IB-IB in FIG. 1A.
Figure 2A:
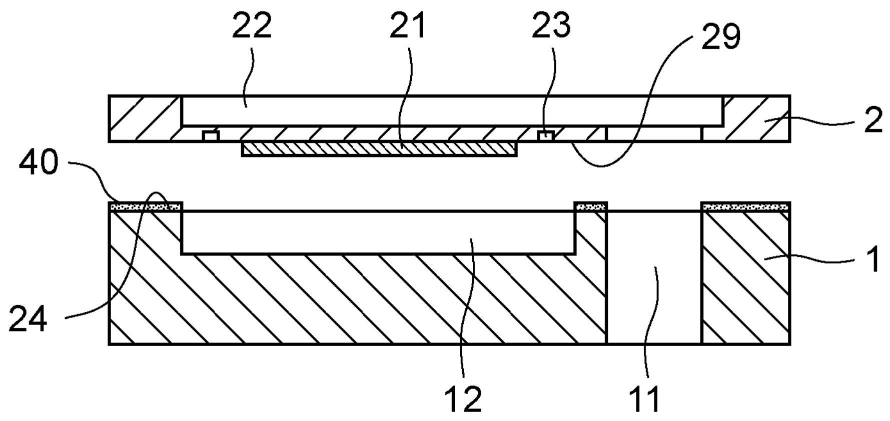
FIGS. 2A and 2B are schematic diagrams illustrating a process for bonding the substrates.

FIG. 1A is a schematic perspective view of a liquid ejection head 4 according to this embodiment. FIG. 1B is a cross-sectional view taken along line IB-IB in FIG. 1A. As in FIGS. 1A and 1B, the liquid ejection head 4 mainly includes the channel substrate 1, the pressure generating substrate 2, and the ejection port substrate 3, which are bonded to each other with an adhesive 40 (FIG. 2A).

The channel substrate 1 is made of a silicon, ceramic, or resin substrate. The channel substrate 1 has through-holes formed by dry etching, wet etching, or physical machining. Each through-hole serves as a supply channel 11 for supplying liquid to the pressure generating element 21. The channel substrate 1 further includes spaces (pressure generation chambers 12) in each of which a pressure generating element 21 that generates pressure for ejecting liquid through an ejection port 31 is provided. If the pressure generating element 21 is a piezoelectric element, this space allows for displacement of the piezoelectric element. The pressure due to the displacement of the piezoelectric element causes the liquid to be ejected through the ejection port 31.

The pressure generating substrate 2 is a silicon, ceramic, or resin substrate. The pressure generating substrate 2 is provided with the pressure generating elements 21, electrodes connected to the pressure generating elements 21, and a circuit (not shown) for selectively supplying power to a specific electrode. The pressure generating elements 21 are made of polycrystalline ceramic, such as lead zirconate titanate (PZT) with piezoelectricity, or a resistive heating element made of an inorganic thin film. The pressure generating substrate 2 further includes liquid chambers 22 next to the pressure generating elements 21, each liquid chamber 22 communicating with the supply channel 11 of the channel substrate 1.

The ejection port substrate 3 is a silicon, ceramic, or resin substrate. The ejection port substrate 3 is provided with ejection ports 31 that eject liquid. Each ejection port 31 communicates with the liquid chamber 22. The pressure generated by the pressure generating element 21 transfers to the liquid chamber 22 to cause the liquid to be ejected through the ejection port 31.

The adhesive 40 for bonding the substrates is made of an epoxy resin, an organic silicon material, or metal paste solely or in mixture, which are selected in consideration of bonding strength and wet durability. The substrates are bonded to each other chemically or physically by applying the adhesive 40 to the bonding surfaces of the substrates and applying energy, such as heat or pressure.

In bonding the plurality of substrates 1 to 3 to produce the liquid ejection head 4, the order of the bonding of the substrates 1 to 3 and the surface to which the adhesive 40 is applied are free provided the lamination relationship among the three substrates is appropriate. In other words, the pressure generating substrate 2 is bonded between the channel substrate 1 and the ejection port substrate 3.

Bonding the Substrates

Figure 2B:
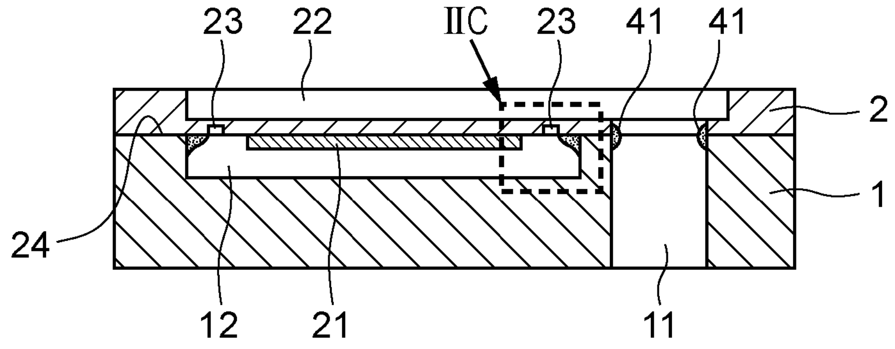
Figure 2C:
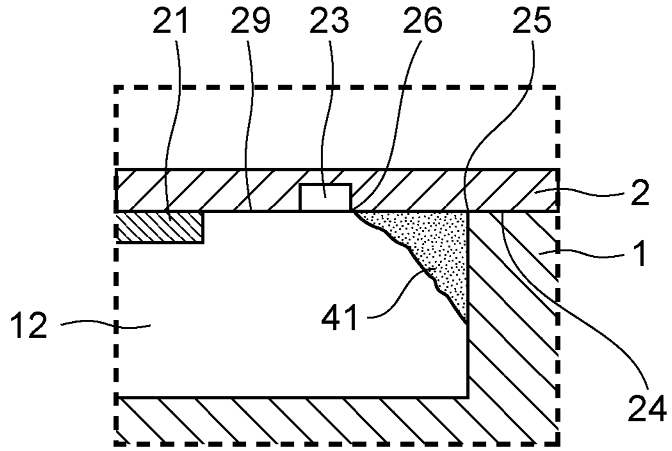
FIG. 2C is an enlarged view of an area IIC shown in FIG. 2B.
Figure 3A:
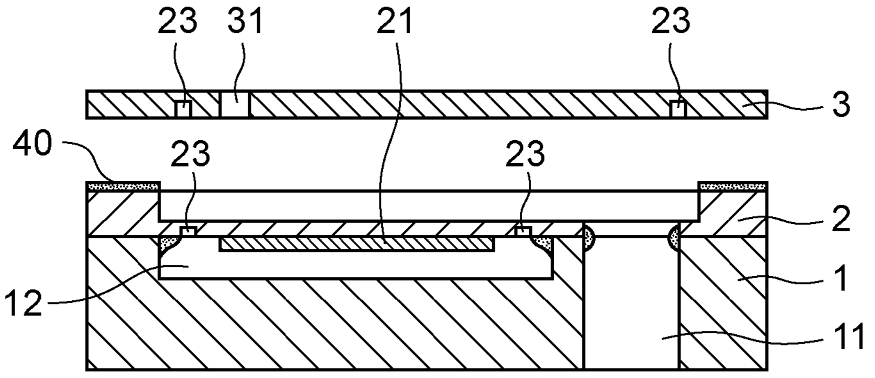
FIGS. 3A and 3B are schematic diagrams illustrating a process for bonding the substrates.
Figure 3B:
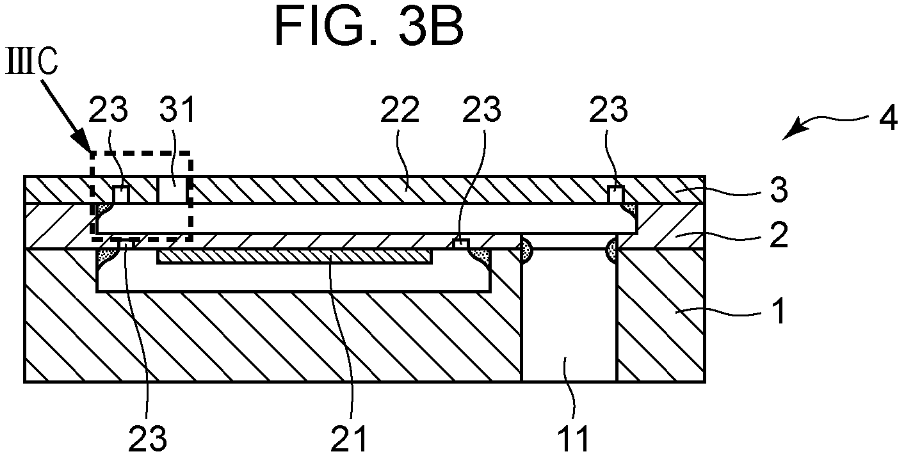
Figure 3C:
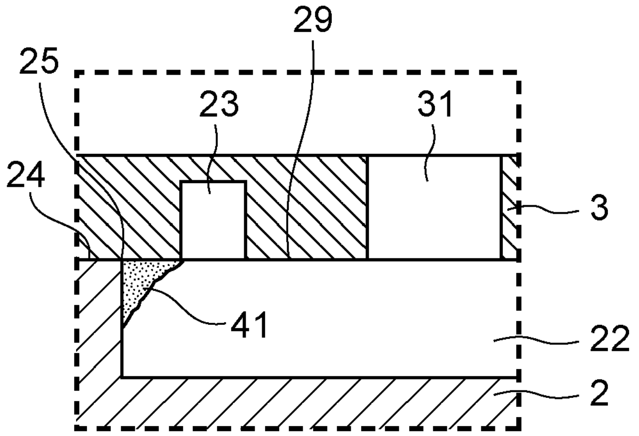
FIG. 3C is an enlarged view of an area IIIC shown in FIG. 3B.

The process of bonding the substrates will be described with reference to FIGS. 2A to 2C and FIGS. 3A to 3C. FIG. 2A is a schematic diagram illustrating a state in which the adhesive 40 is applied to the surface of the channel substrate 1 adjacent to the pressure generating substrate 2. FIG. 2B is a schematic diagram illustrating a state in which the channel substrate 1 and the pressure generating substrate 2 are bonded from the state shown in FIG. 2A. FIG. 2C is an enlarged view of an area IIC shown in FIG. 2B. FIG. 3A is a schematic diagram illustrating a state in which the channel substrate 1 and the pressure generating substrate 2 are bonded, and the adhesive 40 is applied to the surface of the pressure generating substrate 2 adjacent to the ejection port substrate 3. FIG. 3B is a schematic diagram illustrating a state in which the ejection port substrate 3 is bonded to the pressure generating substrate 2 from the state shown in FIG. 3A. FIG. 3C is an enlarged view of an area IIIC shown in FIG. 3B.

A shown in FIG. 2A, the adhesive 40 is applied to a surface (bonding surface) 24 of the channel substrate 1 that is adjacent to the pressure generating substrate 2 and that is to be bonded to the pressure generating substrate 2. The pressure generating substrate 2 is provided with recessed portions 23 in advance in a non-bonding surface 29 which is not bonded to the channel substrate 1. Next, the channel substrate 1 and the pressure generating substrate 2 are bonded by hot press (FIG. 2B). The interface of the substrates after bonding, that is, the thickness of the adhesive 40 on the bonding surface 24, is typically several micrometers or less. An excess adhesive 41 squeezes out of a bonding end 25 of the bonding surface 24 onto the pressure generating substrate 2. The bonding end 25 is the end of the bonding surface 24 adjacent to the structure. The pressure generating element 21 (also referred to as "structure") is present on the pressure generating substrate 2 next to the bonding end 25. The recessed portions 23 are provided on the pressure generating substrate 2 between the bonding end 25 and the pressure generating element 21. At the edge 26 of the recessed portion 23 adjacent to the bonding end 25, the surface tension of the adhesive 40 acts to prevent the squeezed excess adhesive 41 from moving forward. This prevents the excess adhesive 41 from coming into contact with the pressure generating element 21. This reduces or eliminates the influence of the excess adhesive 41 that has squeezed out of the bonding end 25 and adhered to the pressure generating element 21 on the print quality. In FIGS. 2A to 2C, the pressure generating substrate 2 corresponds to the first substrate, and the channel substrate 1 corresponds to the second substrate.

Next, as shown in FIG. 3A, the ejection port substrate 3 in which the recessed portion 23 is provided in advance is prepared. The adhesive 40 is applied to the surface of the pressure generating substrate 2 adjacent to the ejection port substrate 3. The recessed portion 23 of the ejection port substrate 3 is disposed next to the ejection port 31. Thereafter, the ejection port substrate 3 is bonded to form the liquid ejection head 4. As in FIGS. 2C, the excess adhesive 41 can squeeze out of the bonding end 25 onto the ejection port substrate 3 to adhere to the ejection port 31 (also referred to as "structure"). For that reason, forming the recessed portion 23 in the ejection port substrate 3 causes the surface tension of the adhesive 41 at the level difference of the recessed portion 23, thereby preventing the squeezed adhesive 41 from flowing forward. This prevents the ejection port 31 from being closed by the excess adhesive 41, reducing or eliminating the influence on the print quality. Another effect of the limitation of the squeeze to the vicinity of the ejection port 31 is to prevent a volume change of the liquid chamber 22 in the vicinity of the ejection port 31 to reduce the influence on the ejection characteristics. In FIGS. 3A to 3C, the ejection port substrate 3 corresponds to the first substrate, and the pressure generating substrate 2 corresponds to the second substrate.

Even if the squeezed adhesive 41 goes over the level difference of the recessed portion 23, the adhesive 41 is received by the recessed portion 23. Thus, the effect of preventing the adhesive 41 from adhering to the structure can be given.

Second Embodiment

Figure 4A:
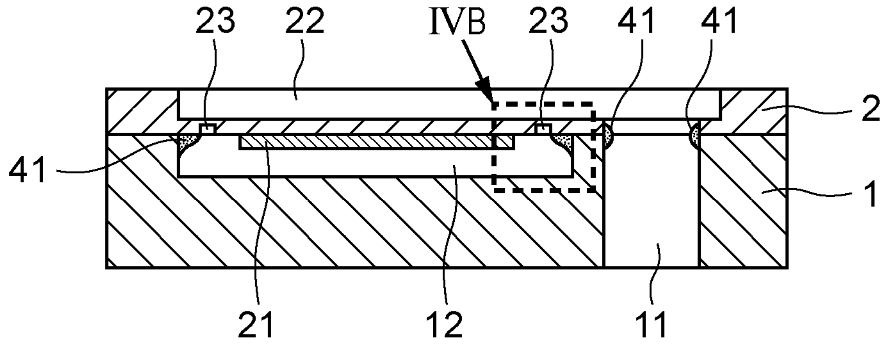
FIG. 4A is a schematic diagram illustrating a recessed portion of a second embodiment.
Figure 4B:
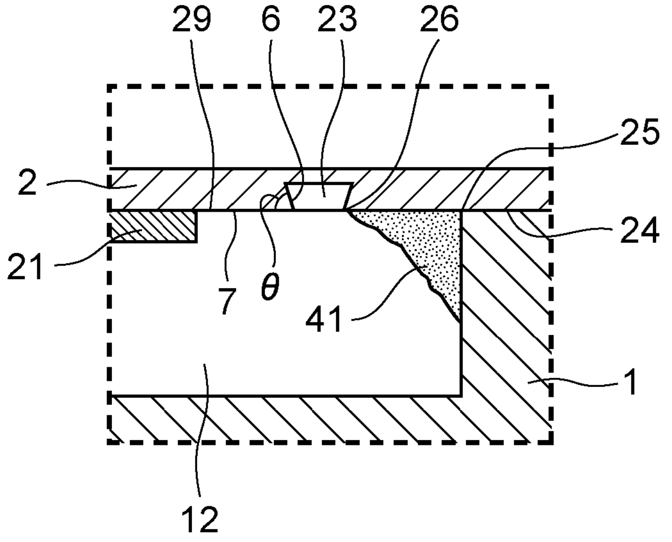
FIG. 4B is an enlarged view of an area IVB shown in FIG. 4A.

A second embodiment will be described with reference to FIGS. 4A and 4B. The same elements as those of the first embodiment are denoted by the same reference signs, and descriptions thereof will be omitted. This embodiment is characterized by the shape of the recessed portion for preventing the adhesive from flowing. Although the following description is made for the recessed portion 23 formed in the pressure generating substrate 2, this also applies to the recessed portion formed in the ejection port substrate 3. FIG. 4A is a schematic diagram illustrating the channel substrate 1 and the pressure generating substrate 2 in this embodiment. FIG. 4B is an enlarged view of an area IVB shown in FIG. 4A. In the following description, the formation angle θ of the recessed portion 23 is an angle formed by the side wall 6 of the recessed portion 23 and the main surface 7 of the pressure generating substrate 2, that is, the angle θ shown in FIG. 4B.

The formation angle θ of the recessed portion 23 is preferably less than 90 degrees, as shown in FIG. 4B. If the amount of the squeezed adhesive 41 is large, the adhesive 41 is pushed out to the edge 26 of the recessed portion 23 because of the surface tension. If the adhesive 41 comes into contact with the inner wall of the recessed portion 23, the block effect is reduced to cause the adhesive 41 to flow into the recessed portion 23. The larger the formation angle θ of the recessed portion 23, the less push-out and the contact with the inner wall is prone to occur to facilitate maintaining the blocking effect. More preferably, the formation angle θ of the recessed portion 23 is 70 degrees or less, and still more preferably, 50 degrees or less. However, the formation angle θ of the recessed portion 23 is preferably 30 degrees or more because excessively small formation angle θ of the recessed portion 23 complicates forming the recessed portion 23.

Third Embodiment

Figure 5A:
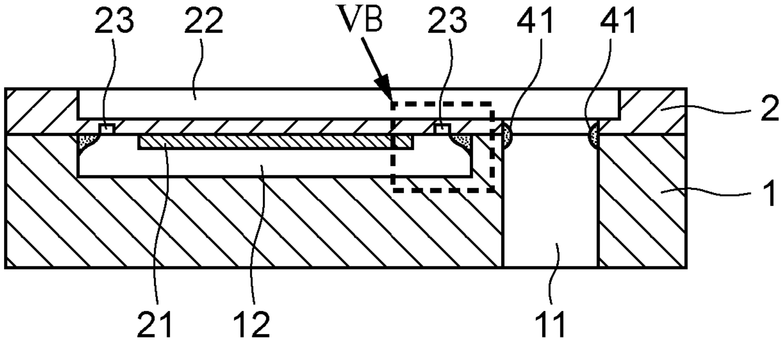
FIG. 5A is a schematic diagram illustrating a recessed portion of a third embodiment.
Figure 5B:
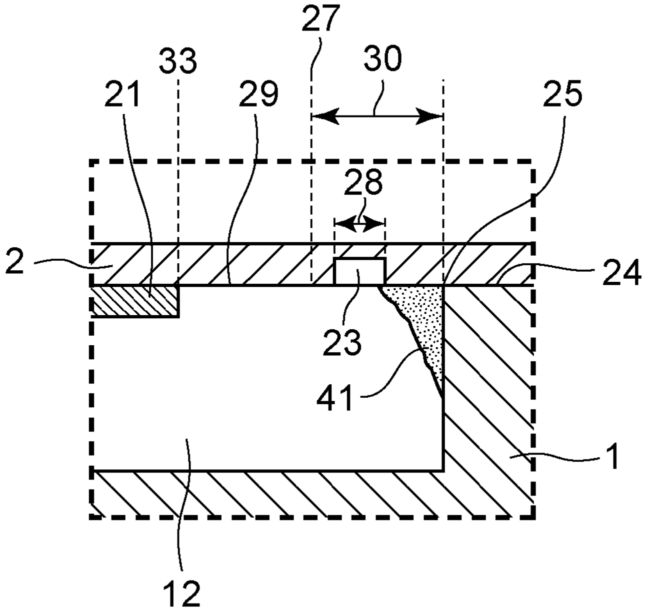
FIG. 5B is an enlarged view of an area VB shown in FIG. 5A.

A third embodiment will be described with reference to FIGS. 5A and 5B, FIGS. 6A and 6B, and FIGS. 7A and 7B. The same elements as those of the first embodiment are denoted by the same reference signs, and descriptions thereof will be omitted. This embodiment is characterized by the position and the size of the recessed portion 23. FIG. 5A is a schematic diagram illustrating the channel substrate 1 and the pressure generating substrate 2 of this embodiment. FIG. 5B is an enlarged view of an area VB shown in FIG. 5A.

The recessed portion 23 may be formed at a position as far as possible from the pressure generating element 21. This is because, if the pressure generating element 21 is a piezoelectric element (PZT), the grooved recessed portion 23 can be susceptible to the stress of the vibration of the PZT element. Thus, the closer the recessed portion 23 to the PZT element, the more the vibration is influenced, for example, the resonant frequency changes. Disposing the recessed portion 23 in a range that is influenced as little as possible, for example, closer to and bonding end 25 with respect to an intermediate position 27 between the bonding end 25 and an end 33 of the pressure generating element 21 adjacent to the bonding end 25, as shown in FIG. 5B. The recessed portion 23 may be disposed in an area closest to the bonding end 25 among the three equal areas between the bonding end 25 and the end 33 of the pressure generating element 21.

For the same reason, the width 28 of the recessed portion 23 may be within a width 30 or less, which is half or less of the distance between the bonding end 25 and the pressure generating element 21 to reduce the influence on the device characteristics. The small width 28 of the recessed portion 23 can minimize a decrease in the strength of the periphery of the recessed portion 23. The width 28 of the recessed portion 23 refers to the length of the short side of the recessed portion 23 of the long side and the short side of the recessed portion 23 (see FIG. 8B).

Figure 6A:
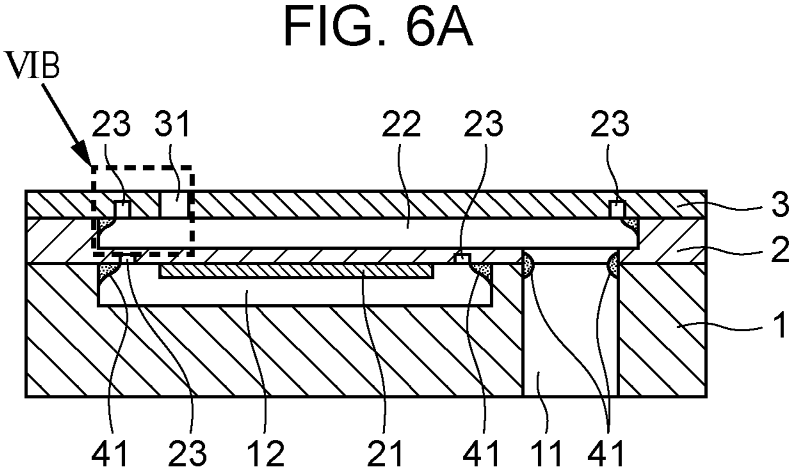
FIG. 6A is a schematic diagram illustrating a recessed portion of the third embodiment.
Figure 6B:
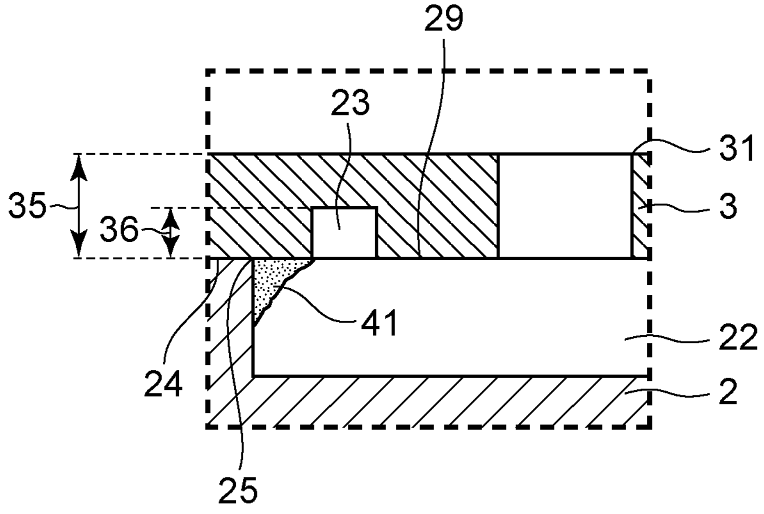
FIG. 6B is an enlarged view of an area VIB shown in FIG. 6A.

FIG. 6A shows an example of the recessed portion 23 formed in the ejection port substrate 3. FIG. 6B is an enlarged view of an area VIB shown in FIG. 6A. The recessed portion 23 may be as deep as possible in consideration of a case in which the bulge of the adhesive 41 due to surface tension breaks to cause the adhesive 41 to wet the interior of the recessed portion 23. In contrast, if the mechanical strength of the periphery of the recessed portion 23 and an influence on the device characteristics described above is taken into account, the recessed portion 23 may be as shallow as possible. For these reasons, the depth 36 of the recessed portion 23 (the depth from the bonding surface 24) is preferably 0.01 times or more and 0.80 times or less the thickness 35 of the ejection port substrate 3 in which the recessed portion 23 is formed.

More preferably, the depth 36 of the recessed portion 23 is 0.01 times or more and 0.50 times or less in the viewpoint of the mechanical strength and so on of the periphery of the recessed portion 23.

Figure 7A:
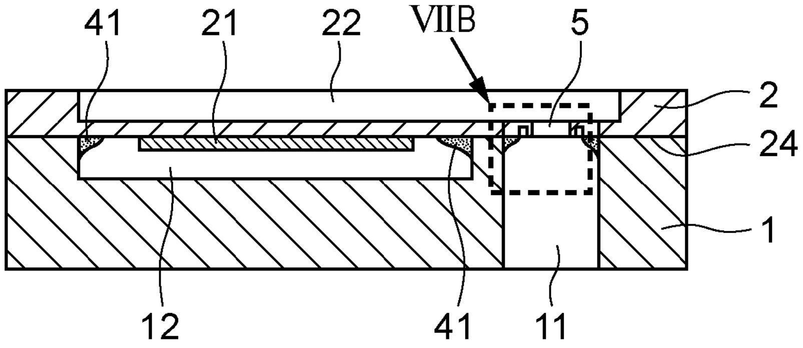
FIG. 7A is a schematic diagram illustrating a recessed portion of the third embodiment.
Figure 7B:
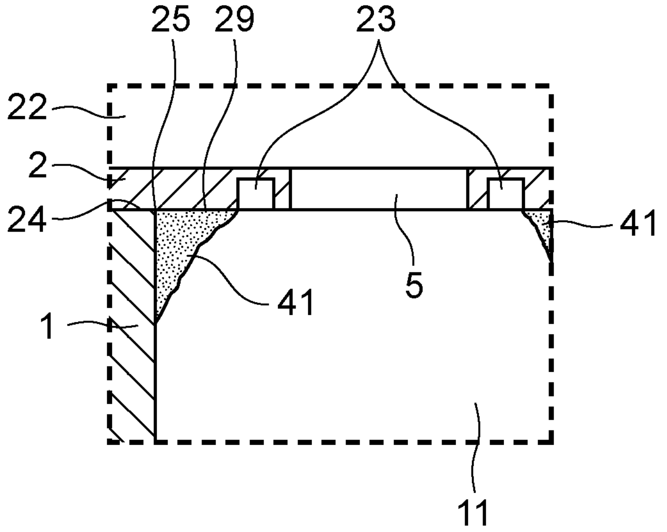
FIG. 7B is an enlarged view of an area VIIB shown in FIG. 7A.

FIG. 7A shows an example in which the recessed portion 23 is formed between the supply channel 11 and the bonding surface 24. FIG. 7B is an enlarged view of an area VIIB shown in FIG. 7A. If the supply channel 11 and the liquid chamber 22 communicate through the communication port 5 (also referred to as "structure") with a smaller diameter than the channel diameter of the supply channel 11, as shown in FIGS. 7A and 7B, closing part of the communication port 5 even with a small amount of excess adhesive 41 disadvantageously increases the flow resistance of the liquid. For this reason, the recessed portion 23 of this embodiment is disposed between the bonding end 25 and the communication port 5, as shown in FIG. 7B. The presence of the recessed portion 23 prevents the excess adhesive 41 from closing the communication port 5.

Fourth Embodiment

Figure 8A:
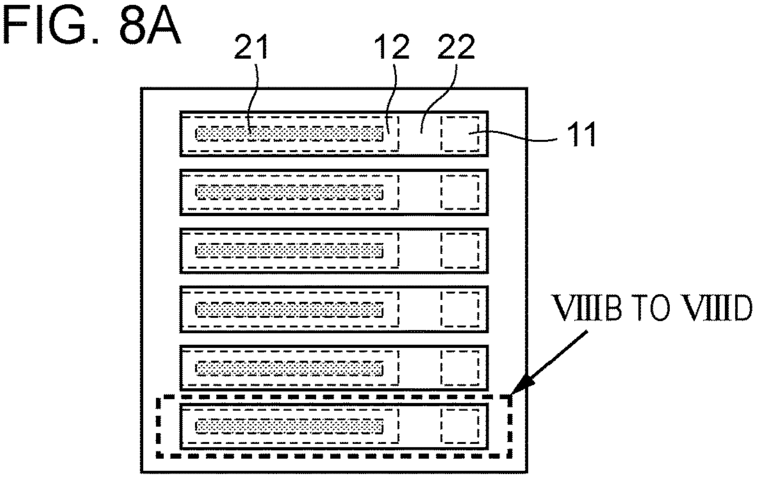
FIG. 8A is a plan view of a channel substrate and a pressure generating substrate bonded to each other viewed from the pressure generating substrate side.
Figure 8B:
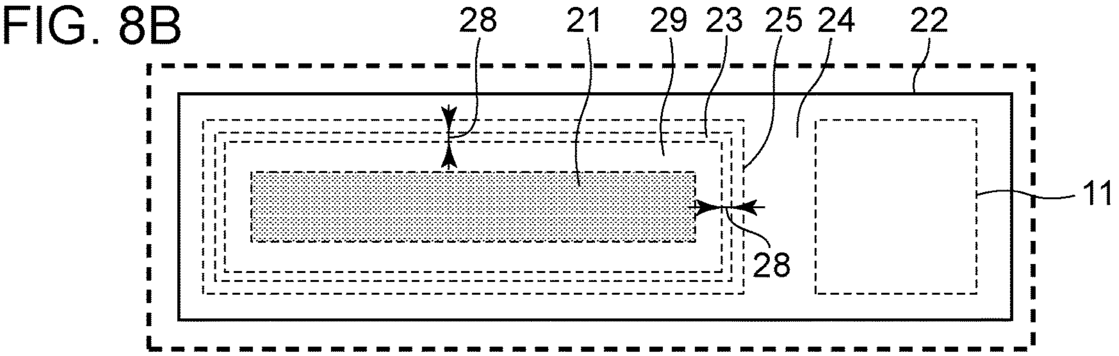
FIGS. 8B to 8D are enlarged views of areas VIIIB to VIIID shown in FIG. 8A.
Figure 8C:
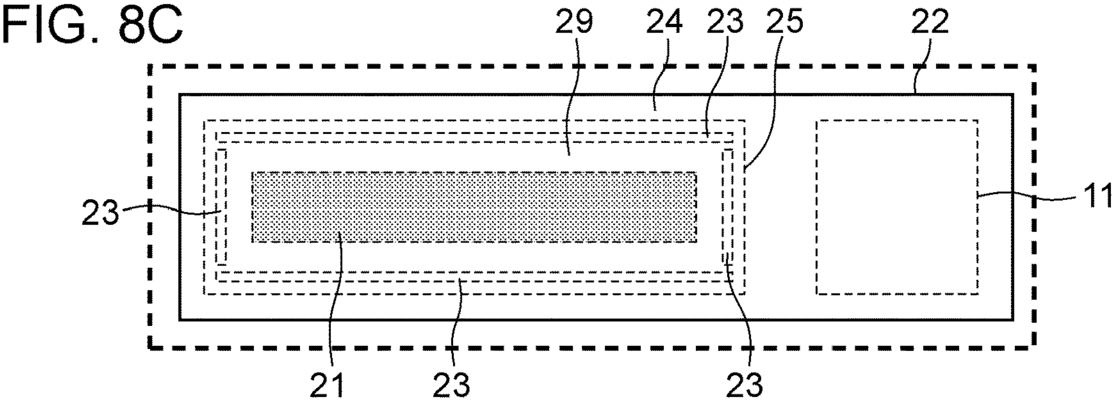
Figure 8D:
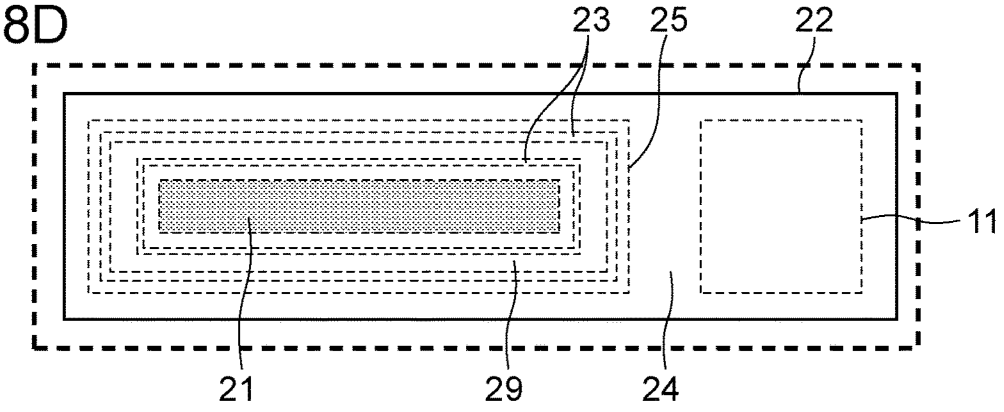

A fourth embodiment will be described with reference to FIGS. 8A to 8D. The same elements as those of the first embodiment are denoted by the same reference signs, and descriptions thereof will be omitted. This embodiment is characterized by the area in which the recessed portion 23 is formed. FIG. 8A is a plan view of the channel substrate 1 and the pressure generating substrate 2 bonded to each other viewed from the pressure generating substrate 2 side. FIGS. 8B to 8D are enlarged views of areas VIIIB to VIIID shown in FIG. 8A. Although FIGS. 8A to 8D show a configuration in which the recessed portion 23 is formed between the pressure generating element 21 and the bonding end 25, this is not intended to limit this embodiment. In other word, the recessed portion 23 may be formed between the ejection port 31 and the bonding end 25, as shown in FIG. 3C.

As shown in FIGS. 8B to 8D, the recessed portion 23 may be disposed in any area between the bonding end 25 and the pressure generating element 21 in plan view. The recessed portion 23 may be continuously formed around the pressure generating element 21, as shown in FIG. 8B, or may be intermittently formed, as shown in FIG. 8C. Alternatively, a plurality of recessed portions 23 may be formed around the pressure generating element 21, as shown in FIG. 8D.

EXAMPLES

The liquid ejection head 4 was formed by bonding a channel substrate 1, a pressure generating substrate 2, and an ejection port substrate 3. The channel substrate 1 is a silicon substrate with a thickness of 500 μm and includes a supply channel 11 with an opening size of 100 μm×100 μm and a pressure generation chamber 12 with a size of 150 μm×2,000 μm and a depth of 100 μm. The pressure generating substrate 2 is a silicon substrate and includes a PZT element 21 made of lead zirconate titanate with a size of 100 μm×1,900 μm, electrodes, and a drive circuit.

The pressure generating substrate 2 was further provided with a liquid chamber 22 with a size of 150 μm×2,500 μm and a depth of 100 μm and a recessed portion 23 with a width of 10 μm so as to enclose the periphery of the PZT element 21. The ejection port substrate 3 was made of silicon with a thickness of 10 μm in which an ejection port 31 with a diameter of 20 μm was formed. The three substrates 1, 2, and 3 were bonded with a thermosetting adhesive composed mostly of a benzocyclobutene resin containing silicon. Observation of the ejection port 31 of the liquid ejection head 4 showed that no blockage due to the excess adhesive 41 occurred.

For comparison, a liquid ejection head without the recessed portions 23 in the pressure generating substrate 2 and the ejection port substrate 3 and with the same size was produced. In this case, blockage due to the excess adhesive 41 occurred.

The present disclosure provides a liquid ejection head in which the flow of an adhesive squeezed out of the bonding surface is reduced or eliminated.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid ejection head comprising:
a first substrate; and
a second substrate bonded to the first substrate with an adhesive,
wherein the first substrate includes a bonding area in contact with the second substrate via the adhesive and a non-bonding area not in contact with the second substrate, and
wherein a recessed portion is disposed in the non-bonding area in a vicinity of an end of the bonding area closer to the non-bonding area.

2. The liquid ejection head according to claim 1, wherein the adhesive is in contact with a corner of the recessed portion.

3. The liquid ejection head according to claim 1, wherein the adhesive is not provided in an area other than an area between the recessed portion and an end of the bonding area closer to the non-bonding area in the non-bonding area.

4. The liquid ejection head according to claim 1, wherein the adhesive is provided in the recessed portion.

5. The liquid ejection head according to claim 1,
wherein the first substrate includes a structure, and
wherein the recessed portion is disposed between the structure and the end.

6. The liquid ejection head according to claim 5, comprising:
an ejection port substrate having an ejection port that ejects liquid;
a pressure generating substrate including a pressure generating element that generates pressure for ejecting liquid through the ejection port; and
a channel substrate including a channel through which the liquid is supplied onto the pressure generating element,
wherein the first substrate is the pressure generating substrate,
wherein the second substrate is the channel substrate, and
wherein the structure is the pressure generating element.

7. The liquid ejection head according to claim 5, comprising:
an ejection port substrate having an ejection port that ejects liquid;
a pressure generating substrate including a pressure generating element that generates pressure for ejecting liquid through the ejection port; and
a channel substrate including a channel through which the liquid is supplied onto the pressure generating element,
wherein the first substrate is the ejection port substrate,
wherein the second substrate is the pressure generating substrate, and
wherein the structure is the ejection port.

8. The liquid ejection head according to claim 5, comprising:
an ejection port substrate having an ejection port that ejects liquid;
a pressure generating substrate including a pressure generating element that generates pressure for ejecting liquid through the ejection port; and
a channel substrate including a channel through which the liquid is supplied onto the pressure generating element,
wherein the pressure generating substrate includes a communication port having a diameter smaller than a channel diameter of the channel,
wherein the channel in the channel substrate connects to the communication port of the pressure generating substrate,
wherein the first substrate is the pressure generating substrate,
wherein the second substrate is the channel substrate, and
wherein the structure is the communication port.

9. The liquid ejection head according to claim 1, wherein the recessed portion is formed at an angle of less than 90 degrees.

10. The liquid ejection head according to claim 1, wherein the recessed portion is formed at an angle of 70 degrees or less.

11. The liquid ejection head according to claim 1, wherein the recessed portion is formed at an angle of 50 degrees or less.

12. The liquid ejection head according to claim 1, wherein the recessed portion is formed at an angle of 30 degrees or more.

13. The liquid ejection head according to claim 5, wherein the recessed portion is formed nearer to the bonding end with respect to an intermediate position between the bonding end and an end of the structure adjacent to the bonding end.

14. The liquid ejection head according to claim 5, wherein the recessed portion is formed within an area closest to the bonding end, of equally divided three areas between the bonding end and an end of the structure adjacent to the bonding end.

15. The liquid ejection head according to claim 5, wherein the recessed portion has a width of half or less of a distance between the bonding end and the structure.

16. The liquid ejection head according to claim 1, wherein a depth of the recessed portion from the bonding surface is 0.01 or more times and 0.80 or less times a thickness of the first substrate in which the recessed portion is formed.

17. The liquid ejection head according to claim 1, wherein a depth of the recessed portion from the bonding surface is 0.01 or more times and 0.50 or less times a thickness of the first substrate in which the recessed portion is formed.

18. The liquid ejection head according to claim 5, wherein the recessed portion continuously encloses the structure in plan view of the first substrate and the second substrate.

19. The liquid ejection head according to claim 5, wherein the recessed portion intermittently encloses the structure in plan view of the first substrate and the second substrate.

20. The liquid ejection head according to claim 5, wherein a plurality of the recessed portions encloses the structure in plan view of the first substrate and the second substrate.

* * * * *